(12) United States Patent
Challener et al.

(10) Patent No.: US 6,687,825 B1
(45) Date of Patent: Feb. 3, 2004

(54) DATA PROCESSING SYSTEM AND METHOD FOR PROTECTING DATA IN A HARD DRIVE UTILIZING A SIGNATURE DEVICE

(75) Inventors: David Carroll Challener, Raleigh, NC (US); Daryl Carvis Cromer, Apex, NC (US); Mark Charles Davis, Durham, NC (US); Dhruv Manmohandas Desai, Cary, NC (US); Charles William Kaufman, Northborough, MA (US); Hernando Ovies, Cary, NC (US); James Peter Ward, Raleigh, NC (US)

(73) Assignee: International Business Machines Corporation, New York, NY (US)

( * ) Notice: Subject to any disclaimer, the term of this patent is extended or adjusted under 35 U.S.C. 154(b) by 0 days.

(21) Appl. No.: 09/527,367

(22) Filed: Mar. 17, 2000

(51) Int. Cl.$^7$ .................................................. G06F 11/30
(52) U.S. Cl. ...................... 713/176; 713/165; 713/175
(58) Field of Search ............................. 713/176, 175, 713/180, 168

(56) References Cited

U.S. PATENT DOCUMENTS

| 4,723,284 | A |   | 2/1988  | Munck et al. ................ 380/25 |
|-----------|---|---|---------|-------------------------------------|
| 4,924,515 | A |   | 5/1990  | Matyas et al. ................ 380/25 |
| 5,214,702 | A |   | 5/1993  | Fischer ........................ 380/30 |
| 5,677,953 | A | * | 10/1997 | Dolphin ........................ 705/51 |
| 5,724,425 | A |   | 3/1998  | Chang et al. .................. 380/25 |
| 6,085,321 | A | * | 7/2000  | Gibbs et al. ................ 713/170 |
| 6,085,322 | A | * | 7/2000  | Romney et al. ............. 713/176 |
| 6,098,056 | A | * | 8/2000  | Rusnak et al. ................ 705/75 |
| 6,105,131 | A | * | 8/2000  | Carroll ........................ 713/155 |
| 2003/0177357 | A1 | * | 9/2003 | Chamberlin et al. ......... 713/168 |

* cited by examiner

Primary Examiner—Norman M. Wright
(74) Attorney, Agent, or Firm—Bracewell & Patterson, LLP; Carlos Munoz-Bustamante

(57) ABSTRACT

A data processing system and method are disclosed for protecting data within a hard disk drive included within a data processing system. Data is generated. A signature value is provided which is stored in a signature device. The signature device is capable of being inserted into and removed from a computer system. A textual description of the data is created. The data is encrypted utilizing both the signature value stored on the device and the textual description. The encrypted data is then stored on the hard disk drive. The data processing system does not permanently store encryption keys.

17 Claims, 4 Drawing Sheets

DATA PROCESSING SYSTEM AND METHOD FOR PROTECTING DATA IN A HARD DRIVE UTILIZING A SIGNATURE DEVICE

BACKGROUND OF THE INVENTION

1. Field of the Invention

The present invention relates in general to data processing systems and, in particular, to a data processing system and method for protecting data in a hard drive utilizing a signature device. Still more particularly, the present invention relates to a data processing system and method for protecting data in a hard drive by encrypting the data utilizing a software signature value stored in the signature device and a textual description of the data.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

There is a need to store data securely in a hard disk drive. One known method for protecting data on a typical hard drive is to provide a power-on password which must be correctly entered prior to gaining access to a computer system. Access to the computer system, including the hard drive, is denied if the correct password is not entered.

Another known system provides a password for protecting the hard drive. In this system, the hard drive is modified so that it stores a password which must be correctly entered prior to data on the hard drive being accessible.

Another known method within a computer system provides for encrypting data to be stored on a hard drive utilizing encryption keys which are permanently stored within the computer system. A problem can arise when this system is to be exported into a foreign country. Certain types of encryption technology, including encryption keys stored within a computer system, may not be exported to other countries.

Therefore a need exists for a data processing system and method for protecting data to be stored in a typical hard drive utilizing a signature value stored in a removable signature device, where the data processing system does not include permanently stored encryption keys.

SUMMARY OF THE INVENTION

A data processing system and method are disclosed for protecting data within a hard disk drive included within a data processing system. Data is generated. A signature value is provided which is stored in a signature device. The signature device is capable of being inserted into and removed from a computer system. A textual description of the data is created. The data is encrypted utilizing both the signature value stored on the device and the textual description. The encrypted data is then stored on the hard disk drive. The data processing system does not permanently store encryption keys.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–5 of the drawings, like numerals being used for like and corresponding parts of the accompanying drawings.

The present invention is a data processing system and method for protecting data to be stored on a hard disk drive. A removable signature device is included which includes a signature value stored on the signature device. The signature value is the digital signature of the signature device. The system includes a typical hard drive which does not include any password or encryption protection. In addition, the computer system does not include stored encryption keys.

A clear, textual description of the data is created. This description is signed utilizing the signature value stored in the signature device. The signed description is then hashed to create a seed value.

An encryption algorithm is utilized to create a temporary encryption key. The encryption algorithm typically utilizes a random number in order to generate an encryption key. In this present invention, however, instead of a random number, the seed value generated by hashing the signed description is utilized to generate an encryption key. The data is then encrypted utilizing the encryption key. The temporary encryption key is then deleted. It is not stored.

In order to utilize the stored data, the data must be decrypted. Therefore, the temporary encryption key must be recreated. To decrypt the data, the clear textual description of the data is retrieved. The signature device having the stored signature value must be utilized in order to decrypt the data. The clear text description is signed utilizing the signature device as described above. The signed description is then utilized in a hash algorithm to generate a hashed value. The hashed value is again used as a seed value in the encryption algorithm to generate a temporary encryption key. The encrypted data is then decrypted utilizing the temporary encryption key.

Figure 1:
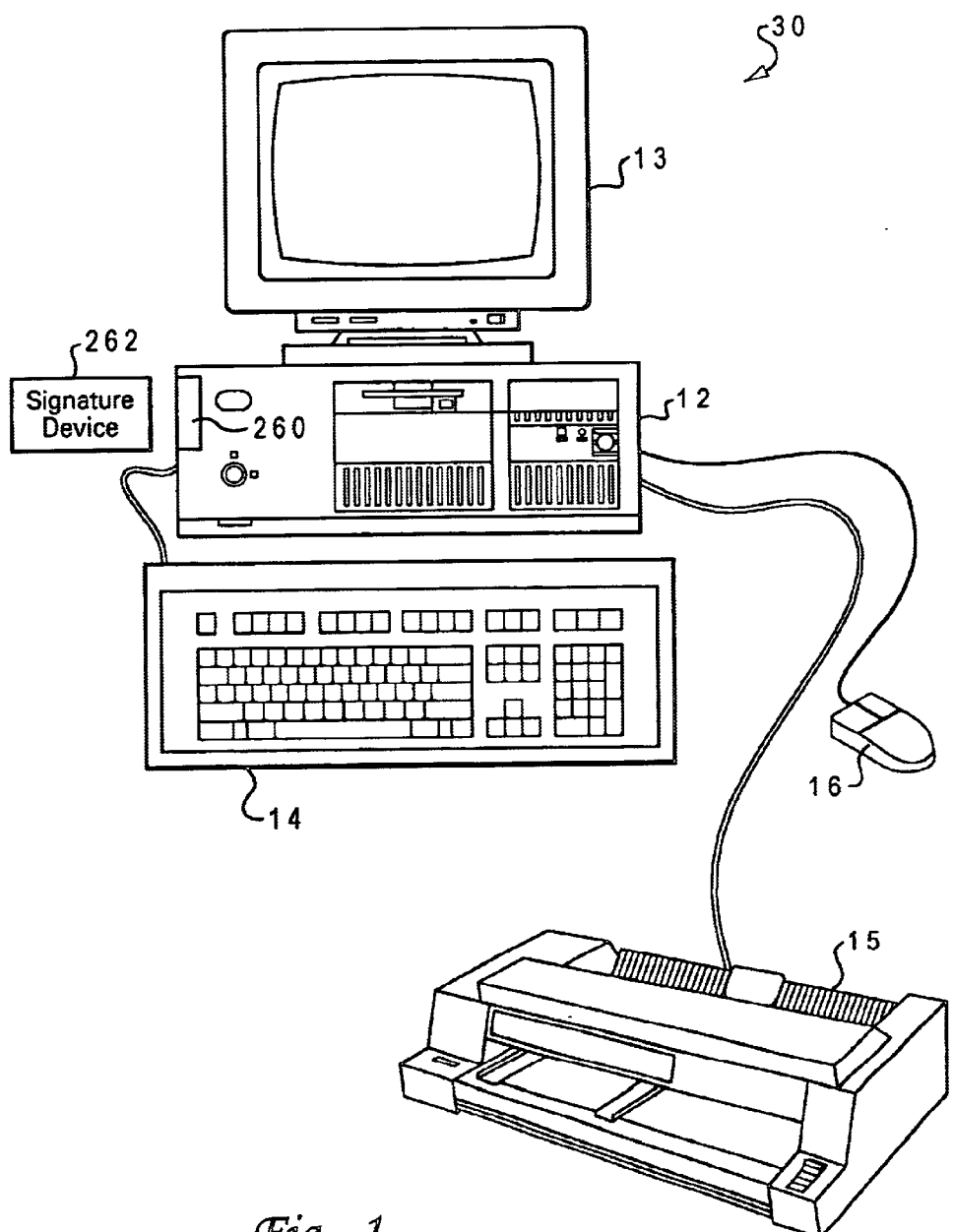
FIG. 1 illustrates a pictorial representation of a data processing system in accordance with the method and system of the present invention.

FIG. 1 illustrates a pictorial representation of a data processing system 30 in accordance with the method and system of the present invention. Computer system 30 includes a computer 12, a monitor 13, a keyboard 14, a mouse 16, and a printer or plotter 15. Computer system 30 may be implemented utilizing any commercially available computer system which has been suitably programmed and which has been modified as described below. Computer system 30 is capable of receiving a variety of different types of inputs from a variety of different types of input devices. Keyboard 14 and mouse 16 are two such types of input devices.

Computer 12 also includes an input port, such as USB port 260 for receiving a USB device, such as USB signature device 262. Signature device 262 is utilized to store a signature value (software key) as described below. Signature device 262 is preferably implemented utilizing a USB smart card reader, such as model GEM PC410 available from GEMPLUS, Redwood City, Calif.

Figure 2:
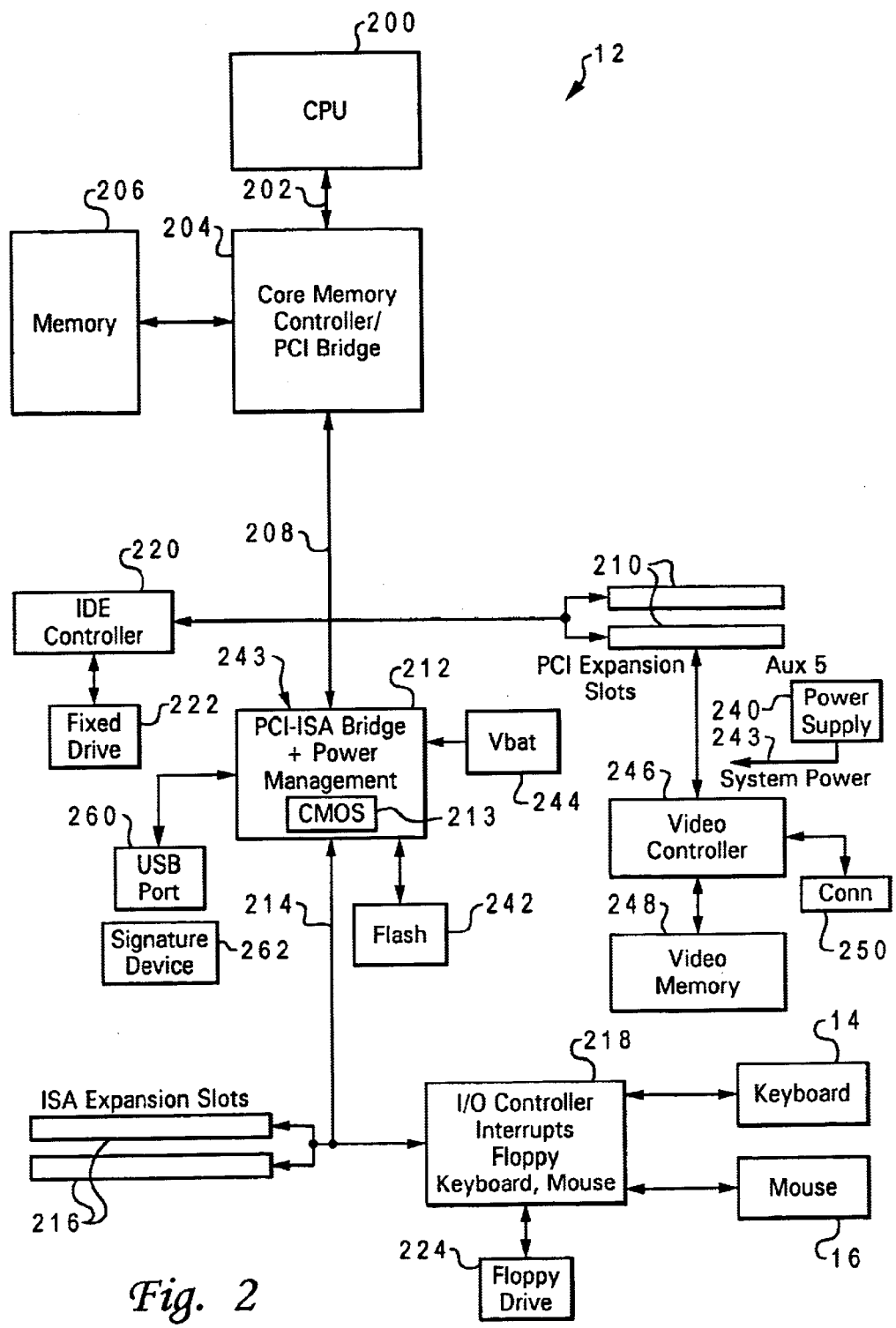
FIG. 2 depicts a more detailed pictorial representation of the data processing system of FIG. 1 in accordance with the method and system of the present invention.

FIG. 2 depicts a more detailed pictorial representation of the data processing system of FIG. 1 in accordance with the method and system of the present invention. Computer 12 includes a planar (also commonly called a motherboard or system board) which is mounted within computer 12 and provides a means for mounting and electrically interconnecting various components of computer 12 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 204 are connected to PCI bus bridge 204 utilizing PCI bus 208. IDE controller 220 provides for the attachment of IDE compatible storage devices, such a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 14, and mouse 16 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer 12 includes a video controller 246 which may, for example, be plugged into one of PCI expansion slots 210. Video controller 246 is connected to video memory 248. The image in video memory 248 is read by controller 246 and displayed on monitor 13 which is connected to computer system 12 through connector 250.

Computer 12 includes a power supply 240 which supplies full normal system power 243.

Figure 3:
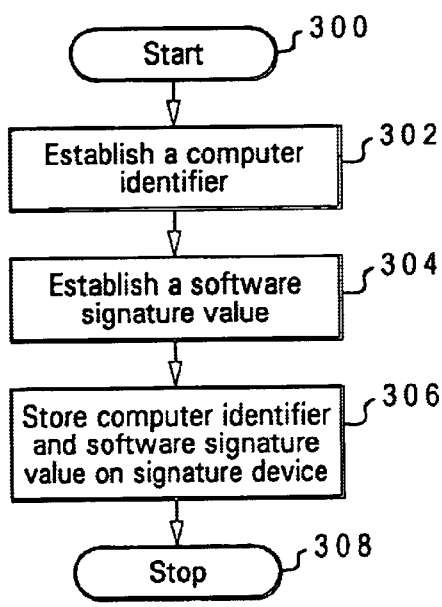
FIG. 3 illustrates a high level flow chart which depicts establishing a signature device including a signature value in accordance with the method and system of the present invention.

FIG. 3 illustrates a high level flow chart which depicts establishing a signature device including a signature value, or software key, in accordance with the method and system of the present invention. The process starts as depicted at block 300 and thereafter passes to block 302 which illustrates establishing a unique computer identifier which identifies one particular computer system. Thereafter, block 304 depicts establishing a software signature value. For example, the software signature value may be an encryption key such as an RSA encryption key.

Encryption algorithms are known to ensure that only the intended recipient of a message can read and access the message. One known encryption algorithm is an asymmetric, or public key, algorithm. The public key algorithm is a method for encrypting messages sent from a first computer system to a second computer system. This algorithm provides for a key pair including a public key and a private key for each participant in a secure communication. This key pair is unique to each participant. Examples of such an encryption scheme are an RSA key pair system, and a secure sockets layer (SSL) system.

Next, block 306 illustrates the storage of the computer identifier and the software signature value in a signature device. The process then terminates as depicted at block 308.

Figure 4:
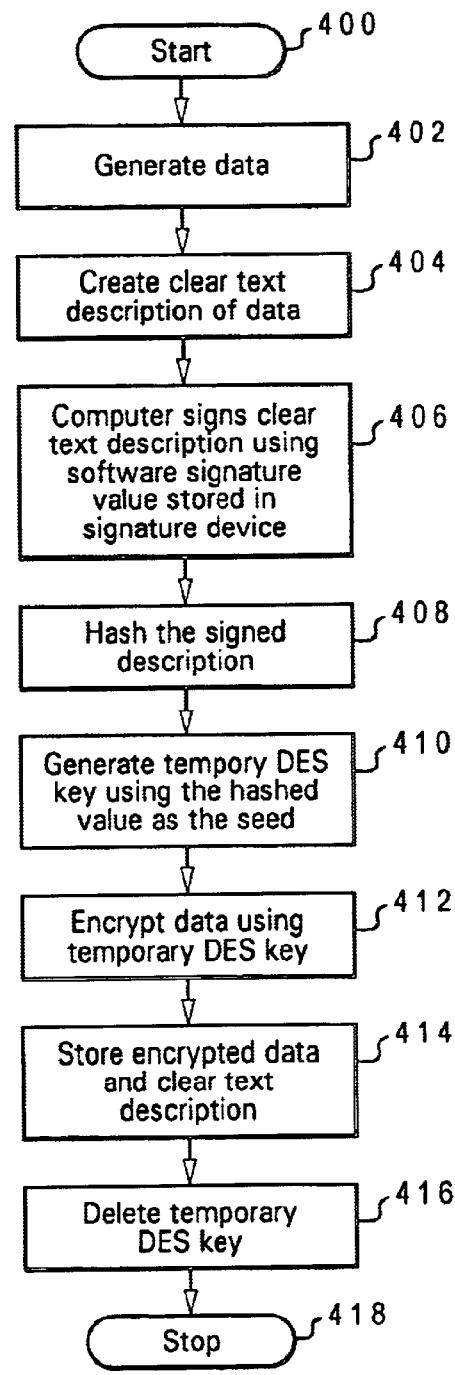
FIG. 4 depicts a high level flow chart which illustrates a computer system encrypting data utilizing a signature device to store on a hard disk drive in accordance with the method and system of the present invention.

FIG. 4 depicts a high level flow chart which illustrates a computer system encrypting data to store on a hard disk drive utilizing a signature device in accordance with the method and system of the present invention. The process starts as depicted at block 400 and thereafter passes to block 402 which illustrates the generation of data. Next, block 404 depicts the creation of a clear text description of the data. The process then passes to block 406 which illustrates the computer system signing the clear text description using the software signature value stored in the signature device. A signature is a unique number which uniquely identifies a particular device. A signature is used to authenticate the data signed utilizing the signature as being generated by the device identified by the signature. A device signs data by appending its unique number to the data. In this manner, the data itself is not changed. The unique signature is added to the data to create the signed data. In accordance with an important feature of the present invention, the data is signed utilizing a software signature value stored in the signature device, and not with a signature of the computer system. Thereafter, block 408 depicts hashing the signed description utilizing any commercially available hashing algorithm.

Block 410, then, illustrates the generation of a temporary encryption key, preferably utilizing a DES algorithm. The DES algorithm utilizes a seed in order to generate a DES key. Ordinarily, and in known systems, the seed utilized by the algorithm is a random number. In the present invention, the seed is the hashed, signed, clear text description. The process then passes to block 412 which depicts the computer system encrypting the data utilizing the temporary DES key. In this manner, the encrypted data is protected by the signature device. The data cannot be decrypted without utilizing the signature device. Thereafter, block 414 illustrates the storage of both the encrypted data and the clear text description into the hard disk drive. Next, block 416 depicts the deletion of the temporary DES key. The process then terminates as illustrated at block 418.

Figure 5:
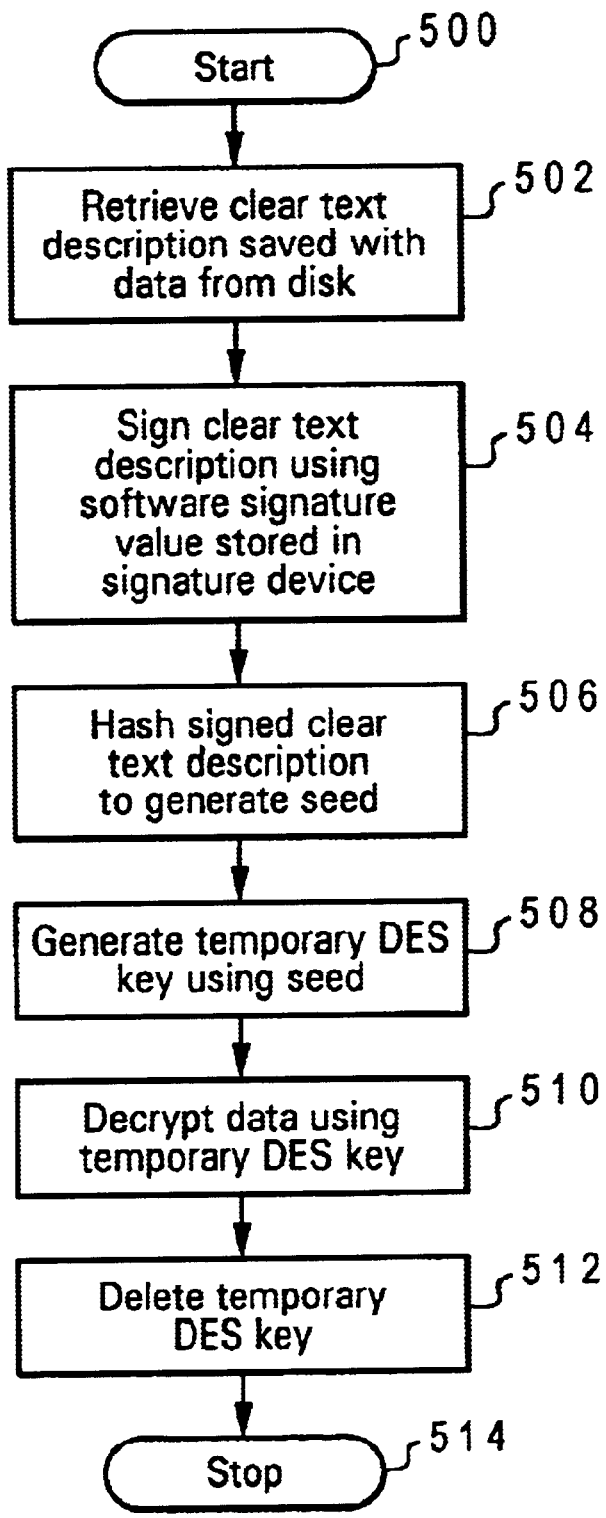
FIG. 5 illustrates a high level flow chart which depicts a computer system accessing encrypted data stored on a hard disk drive utilizing a signature device in accordance with the method and system of the present invention.

FIG. 5 illustrates a high level flow chart which depicts a computer system accessing encrypted data stored on a hard disk drive utilizing a signature device in accordance with the method and system of the present invention. The process starts as illustrated at block 500 and thereafter passes to block 502 which depicts retrieving the clear text description from the hard disk drive for the data to decrypt. Next, block 504 illustrates the computer system signing the clear text description using the software signature value stored in the signature device. Thereafter, block 506 depicts hashing the signed clear text description in order to generate a seed to be used in a DES algorithm.

Block 508, then, illustrates the generation of a temporary DES encryption key using the seed generated as depicted by block 506. The process then passes to block 510 which depicts the decryption of the data utilizing the temporary DES key. The temporary DES key is then deleted as illustrated by block 512. The process then terminates as depicted at block 514.

While a preferred embodiment has been particularly shown and described, it will be understood by those skilled in the art that various changes in form and detail may be made therein without departing from the spirit and scope of the present invention.

What is claimed is:

1. A method for protecting data within a hard disk drive included within a data processing system, said method comprising the steps of:
   generating data;
   providing a software signature value stored on a signature device, said software signature value being a digital signature of said signature device, said signature device capable of being inserted into and removed from a computer system;
   creating a textual description of said data;
   encrypting said data utilizing both said software signature value stored on said device and said textual description while said signature device is inserted into said computer system; and
   storing said encrypted data on said hard disk drive.

2. The method according to claim 1, further comprising the step of signing said textual description utilizing said software signature value.

3. The method according to claim 2, further comprising the step of generating a seed value utilizing said signed textual description utilizing a hashing algorithm.

4. The method according to claim 3, further comprising the step of generating a temporary encryption key utilizing said seed value.

5. The method according to claim 4, further comprising the step of encrypting said data utilizing said temporary encryption key.

6. The method according to claim 5, further comprising the step of decrypting said data utilizing said signature device and said clear text description.

7. The method according to claim 6, wherein the step of decrypting said data further comprises the step of:

signing said textual description utilizing said software signature value;
regenerating said seed value utilizing said signed textual description;
regenerating said temporary encryption key utilizing said seed value; and
decrypting said data utilizing said temporary encryption key.

8. The method according to claim 7, wherein the step of generating said temporary encryption key further comprises the step of generating a DES encryption key.

9. A data processing system for protecting data within a hard disk drive included within said data processing system, comprising:
   means for generating data;
   a signature device including a software signature value stored on said signature device, said software signature value being a digital signature of said signature device, said signature device capable of being inserted into and removed from a computer system;
   means for creating a textual description of said data;
   said system having a processor executing code for encrypting said data utilizing both said software signature value stored on said device and said textual description while said signature device is inserted into said computer system; and
   said processor executing code for storing said encrypted data on said hard disk drive.

10. The system according to claim 9, further comprising said processor executing code for signing said textual description utilizing said software signature value.

11. The system according to claim 10, further comprising said processor executing code for generating a seed value utilizing said signed textual description.

12. The system according to claim 11, further comprising said processor executing code for generating a temporary encryption key utilizing said seed value utilizing a hashing algorithm.

13. The system according to claim 12, further comprising said processor executing code for encrypting said data utilizing said temporary encryption key.

14. The system according to claim 13, further comprising said processor executing code for decrypting said data utilizing said signature device and said clear text description.

15. The system according to claim 14, wherein said processor executing code for decrypting said data further comprises:
   said processor executing code for signing said textual description utilizing said software signature value;
   said processor executing code for regenerating said seed value utilizing said signed textual description;
   said processor executing code for regenerating said temporary encryption key utilizing said seed value; and
   said processor executing code for decrypting said data utilizing said temporary encryption key.

16. The system according to claim 15, wherein said processor executing code for generating said temporary encryption key further comprises said processor executing code for generating a DES encryption key.

17. A data processing system for protecting data within a hard disk drive included within said data processing system, comprising:
   means for generating data;
   a signature device including a software signature value stored on said signature device, said signature device capable of being inserted into and removed from a computer system;

means for creating a textual description of said data;

said system having a processor executing code for encrypting said data utilizing both said software signature value stored on said device and said textual description;

said processor executing code for storing said encrypted data on said hard disk drive;

said processor executing code for signing said textual description utilizing said software signature value;

said processor executing code for generating a seed value utilizing said signed textual description;

said processor executing code for generating a temporary DES encryption key utilizing said seed value;

said processor executing code for encrypting said data utilizing said temporary DES encryption key;

said processor executing code for signing said textual description utilizing said software signature value;

said processor executing code for regenerating said seed value utilizing said signed textual description;

said processor executing code for regenerating said temporary DES encryption key utilizing said seed value;

said processor executing code for decrypting said data utilizing said temporary DES encryption key.

\* \* \* \* \*

UNITED STATES PATENT AND TRADEMARK OFFICE
Certificate

Patent No. 6,687,825 B1                                  Patented: February 3, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: David Carroll Challener, Raleigh, NC (US); Daryl Carvis Cromer, Apex, NC (US); Mark Charles Davis, Durham, NC (US); Dhruv Manmohandas Desai, Cary, NC (US); Charles William Kaufman, Northborough, MA (US); Hernando Ovies, Cary, NC (US); James Peter Ward, Raleigh, NC (US); and David Robert Safford, Brewster, NY (US).

Signed and Sealed this Sixth Day of February 2007.

GILBERTO BARRON, JR.
*Supervisory Patent Examiner*
Art Unit 2132